United States Patent
Ike et al.

(10) Patent No.: US 9,663,076 B2
(45) Date of Patent: May 30, 2017

(54) VEHICLE BRAKING CONTROL APPARATUS

(71) Applicants: TOYOTA JIDOSHA KABUSHIKI KAISHA, Toyota-shi, Aichi-ken (JP); ADVICS CO., LTD., Kariya-shi, Aichi-ken (JP)

(72) Inventors: Wataru Ike, Nagoya (JP); Yosuke Ohmori, Kariya (JP)

(73) Assignees: TOYOTA JIDOSHA KABUSHIKI KAISHA, Toyota (JP); ADVICS CO., LTD., Kariya (JP)

( * ) Notice: Subject to any disclaimer, the term of this patent is extended or adjusted under 35 U.S.C. 154(b) by 26 days.

(21) Appl. No.: 14/931,239

(22) Filed: Nov. 3, 2015

(65) Prior Publication Data
US 2016/0185325 A1    Jun. 30, 2016

(30) Foreign Application Priority Data
Dec. 26, 2014    (JP) .................................. 2014-266316

(51) Int. Cl.
*B60T 7/22* (2006.01)
*B60T 8/1755* (2006.01)

(52) U.S. Cl.
CPC ............ *B60T 7/22* (2013.01); *B60T 8/17558* (2013.01); *B60T 2201/022* (2013.01)

(58) Field of Classification Search
CPC ........................................................ B60T 7/22
See application file for complete search history.

(56) References Cited

U.S. PATENT DOCUMENTS

| | | | | |
|---|---|---|---|---|
| 5,754,099 | A | * 5/1998 | Nishimura | ................ B60T 7/22 340/435 |
| 2005/0010351 | A1 | * 1/2005 | Wagner | .............. B60K 31/0008 701/96 |
| 2007/0032952 | A1 | * 2/2007 | Carlstedt | ............ B60R 21/0134 701/301 |
| 2009/0018740 | A1 | * 1/2009 | Noda | ........................ B60T 7/22 701/70 |

(Continued)

FOREIGN PATENT DOCUMENTS

JP    2009-101756 A    5/2009
JP    2011-110958 A    6/2011

*Primary Examiner* — Yonel Beaulieu
*Assistant Examiner* — Martin Weeks
(74) *Attorney, Agent, or Firm* — Oliff PLC (57) ABSTRACT

A vehicle braking control apparatus includes an obstacle detection unit to detect an obstacle ahead of a vehicle, and a distance and a relative speed of the obstacle; a time to collision calculation unit to calculate time to collision with the obstacle; an estimated distance calculation unit to calculate an estimated distance to the obstacle when the obstacle has gone out of detection; and a braking control unit to generate a braking force automatically when the time to collision is a predetermined time or less, and when the obstacle has gone out of detection while the braking force is generated, to release the braking force when the estimated distance is a predetermined threshold (<0) or less, wherein the obstacle is classified into a type depending on precision of the distance and relative speed, to set the predetermined threshold less while the precision is worse.

4 Claims, 6 Drawing Sheets

(56) References Cited

U.S. PATENT DOCUMENTS

| | | | |
|---|---|---|---|
| 2010/0023226 A1* | 1/2010 | Ito | B60R 21/0134 |
| | | | 701/46 |
| 2015/0353062 A1* | 12/2015 | Breuer | B60T 7/22 |
| | | | 701/70 |
| 2016/0193999 A1* | 7/2016 | Sasabuchi | B60T 7/22 |
| | | | 701/301 |

* cited by examiner

| KIND OF OBSTACLE | PRECEDING VEHICLE | PEDESTRIAN | OTHERS |
|---|---|---|---|
| Dth1 | A11 | A12 | A13 |

WHERE $0 > A11 > A12 \geqq A13$

FIG.4B

| STOPPED/MOVING | STOPPED | MOVING |
|---|---|---|
| Dth1 | A21 | A22 |

WHERE $0 > A21 > A22$

FIG.4C

| STOPPED/MOVING | STOPPED | | | MOVING | | |
|---|---|---|---|---|---|---|
| KIND OF OBSTACLE | PRECEDING VEHICLE | PEDESTRIAN | OTHERS | PRECEDING VEHICLE | PEDESTRIAN | OTHERS |
| Dth1 | A31 | A32 | A33 | A34 | A35 | A36 |

WHERE $0 > A31 > A32 \geqq A33$, $0 > A34 > A35 \geqq A36$, $0 > A31 > A34$, $0 > A32 > A35$, $0 > A33 > A36$

VEHICLE BRAKING CONTROL APPARATUS

FIELD

The disclosures herein generally relate to a vehicle braking control apparatus that avoids a collision with an obstacle ahead of a vehicle.

BACKGROUND

Conventionally, a collision damage reduction apparatus has been known that makes the brake of a vehicle operate automatically when time to collision (TTC) becomes a predetermined time or shorter where the TTC is a time until the vehicle collides with an obstacle, which is calculated based on the distance to the detected obstacle and the relative speed of the vehicle with respect to the obstacle (see, for example, Patent Document 1)

An obstacle detection unit, such as a radar (a millimeter-wave radar, a laser radar, etc.) or a camera, included in such a collision damage reduction apparatus has a limit in its detection range of obstacles. Specifically, if the distance to an obstacle is very short (for example, the distance to an obstacle is 2 m or shorter), the obstacle comes into the dead angle of the obstacle detection unit, and the obstacle is not detected by the obstacle detection unit. Therefore, by continuing a brake-operational state until the vehicle stops even if the obstacle has gone out of detection, a collision with the obstacle gone out of detection can be avoided appropriately.

On the other hand, it is desirable to release a brake-operational state before the vehicle stops, for cases where, for example, an erroneously detected obstacle, such as a manhole cover on a road surface, has gone out of detection; after an obstacle (a preceding vehicle) has gone out of detection, the obstacle makes a lane change or the like to avoid a collision; and the like.

Thereupon, a technology has been proposed that calculates an estimated distance to the obstacle if an obstacle has gone out of detection, and if the estimated distance is less than or equal to 0, releases the brake-operational state (see, for example, Patent Document 2). Namely, if the estimated distance is less than or equal to 0, it can be considered that the vehicle reaches the obstacle that has gone out of detection. Therefore, if a collision is not detected in this case, it can be determined that a collision with the obstacle gone out of detection is avoided, or the brake operation was made due to an erroneous detection of the obstacle. Therefore, if the estimated distance is less than or equal to 0, by releasing the brake-operational state, it is possible to have the vehicle resume normal traveling, base on an appropriate determination that a collision with the obstacle gone out of detection is avoided, or the brake operation was made due to an erroneous detection of the obstacle, and the brake-operational state to avoid a collision with the obstacle gone out of detection has been continued until the determination is made.

RELATED-ART DOCUMENTS

Patent Documents

[Patent Document 1] Japanese Laid-open Patent Publication No. 2009-101756
[Patent Document 2] Japanese Laid-open Patent Publication No. 2011-110958

However, since the estimated distance to an obstacle is calculated based on a distance to the obstacle detected by the obstacle detection unit before the obstacle goes out of detection, and the relative speed of the obstacle with respect to the vehicle, a problem may arise with the technology described in Patent Document 2 as follows.

For example, the distance to an obstacle detected by the obstacle detection unit, and the relative speed of the obstacle with respect to the vehicle may have different detection precision depending on types of obstacles (for example, the obstacle may be a preceding vehicle, or a pedestrian). Specifically, if using a radar as the obstacle detection unit, the reflected wave coming back from a pedestrian has comparatively less strength, and is susceptible to noise or disturbance. Therefore, the detection precision tends to be reduced for the distance and the relative speed if the obstacle is a pedestrian. Also, if using a camera as the obstacle detection unit, a captured image of a pedestrian includes fewer edge components for edge detection, and precision is comparatively reduced in identifying a range in the captured image that corresponds to the pedestrian. Therefore, the detection precision tends to be reduced for the distance and the relative speed if the obstacle is a pedestrian. Therefore, the estimated distance to the obstacle gone out of detection depends on the type of an obstacle, and the calculation precision varies. Consequently, if the estimated distance is less than or equal to 0, there are cases where it is not possible to uniformly determine that the vehicle reaches the obstacle gone out of detection.

Thereupon, in view of the above, it is an object of at least one embodiment of the present invention to provide a vehicle braking control apparatus that is capable of, if an obstacle detected by an obstacle detection unit has gone out of detection after having the brake operate based on time to collision (TTC) until the vehicle collides with the obstacle, releasing the brake-operational state, by determining appropriately that a collision with the obstacle gone out of detection is avoided, or the brake operation was made due to an erroneous detection of the obstacle, while the brake-operational state to avoid a collision with the obstacle gone out of detection has been continued until the determination is made.

SUMMARY

According to at least one embodiment of the present invention, a vehicle braking control apparatus includes an obstacle detection unit configured to detect an obstacle ahead of a vehicle, and to detect a distance to the obstacle from the vehicle, and a relative speed of the obstacle with respect to the vehicle; a time to collision calculation unit configured to calculate a time to collision until the vehicle collides with the obstacle, based on the distance and the relative speed; an estimated distance calculation unit configured to calculate, when the obstacle has gone out of detection by the obstacle detection unit, an estimated distance to the obstacle from the vehicle, at least based on the distance and the relative speed before the obstacle has gone out of detection by the obstacle detection unit; and a braking control unit configured to generate a braking force of the vehicle automatically when the time to collision is less than or equal to a predetermined time, and when the obstacle has gone out of detection by the obstacle detection unit in a state where the braking force is generated, to release the state where the braking force is generated when the estimated distance is less than or equal to a predetermined threshold set less than zero. The obstacle is classified into a type depending on detection precision of the distance and the relative speed by the obstacle detection unit, to set the predetermined threshold less while the detection precision is worse.

According to at least one embodiment of the present invention, it is possible to provide a vehicle braking control apparatus that is capable of, if an obstacle detected by an obstacle detection unit has gone out of detection after having the brake operate based on time to collision (TTC) until the vehicle collides with the obstacle, releasing the brake-operational state, by determining appropriately that a collision with the obstacle gone out of detection is avoided, or the brake operation was made due to an erroneous detection of the obstacle, while the brake-operational state to avoid a collision with the obstacle gone out of detection has been continued until the determination is made.

DESCRIPTION OF EMBODIMENTS

In the following, embodiments of the present invention will be described with reference to the drawings.

First Embodiment

Figure 1:
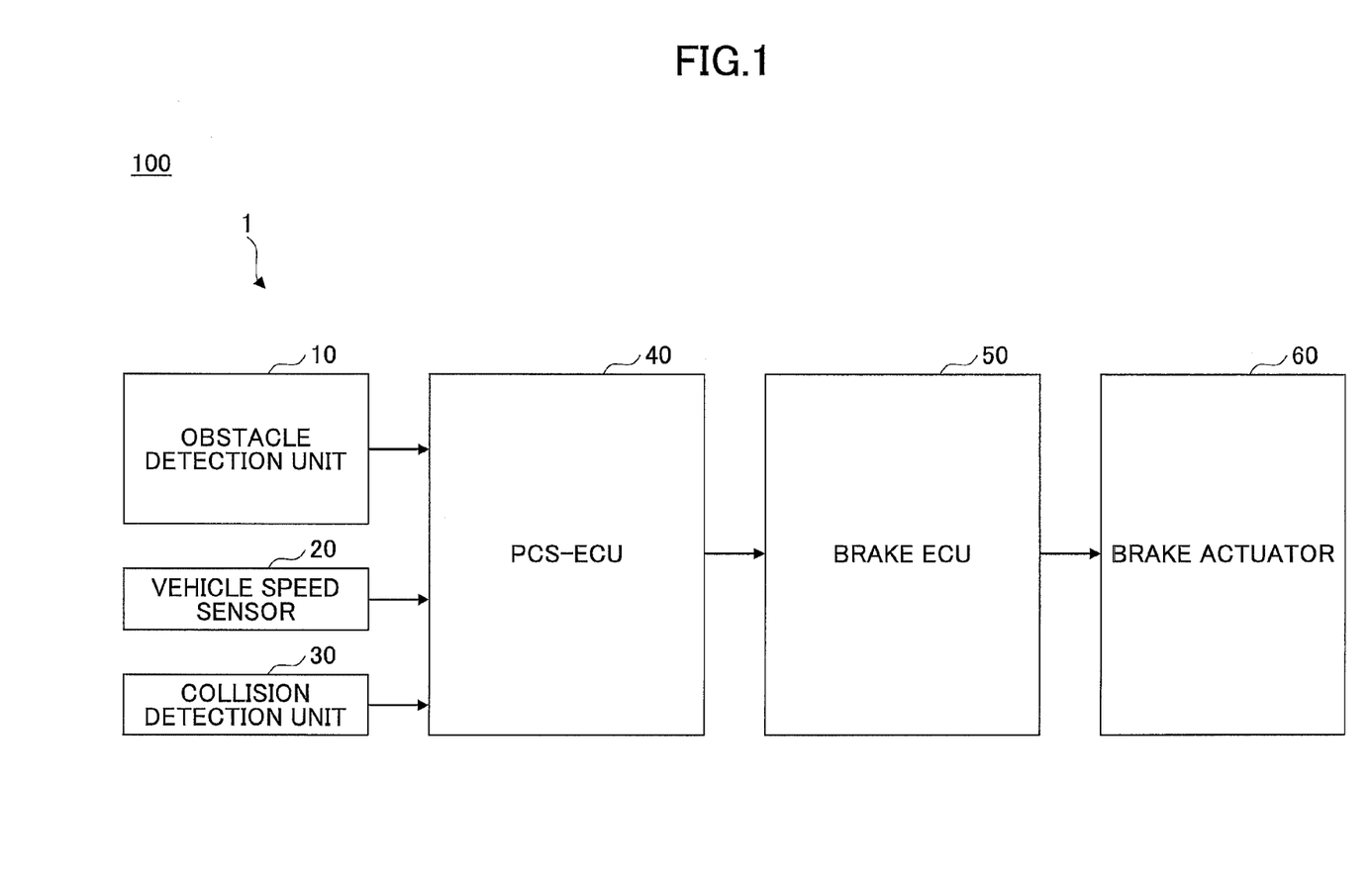
FIG. 1 is a block diagram that illustrates an example of a configuration of a braking control apparatus.

FIG. 1 is a block diagram that illustrates an example of a configuration of a braking control apparatus 1 according to the present embodiment. In the following, notations about directions, "front", "rear", "left", "right", "up", and "down" designate front, rear, left, and right, up, and down directions, respectively, with respect to a vehicle 100.

The braking control apparatus 1 is installed in the vehicle 100, and executes drive support to generate a braking force for the vehicle 100 automatically, to prevent the vehicle 100 from colliding with an obstacle. Note that the vehicle 100 may be an arbitrary vehicle, such as a vehicle having an engine as an only driving force source, or an electrically driven vehicle (a hybrid vehicle, a range extender vehicle, an electric vehicle (vehicle having a motor as an only driving force source)).

The braking control apparatus 1 according to the present embodiment is configured to include an obstacle detection unit 10, a vehicle speed sensor 20, a collision detection unit 30, a PCS (Pre-Crash Safety)-ECU (Electronic Control Unit) 40, a brake ECU 50, and a brake actuator 60.

The obstacle detection unit 10 detects an obstacle (a preceding vehicle, a pedestrian, a fixed object on a road, etc.), ahead of the vehicle 100, and detects the distance from the vehicle 100 to the obstacle (simply referred to as the "distance to the obstacle" below), and the relative speed of the obstacle with respect to the vehicle 100 (simply referred to as the "relative speed of the obstacle" below). The obstacle detection unit 10 may be a known radar sensor (a millimeter-wave radar, a laser radar, etc.) to detect an obstacle ahead of the vehicle 100, by transmitting, for example, a detection wave (a radio wave, a light wave, etc.) ahead of the vehicle 100, and receiving a reflected wave that corresponds to the detection wave. Also, the obstacle detection unit 10 may be a known camera sensor to detect an obstacle ahead of the vehicle 100, by capturing an image ahead of the vehicle 100 by using an imaging element, for example, a CCD (Charge Coupled Device), or a CMOS (Complementary Metal-Oxide Semiconductor), and applying predetermined image processing to the captured image. Also, the obstacle detection unit 10 may be configured to include both a radar sensor and a camera sensor.

Note that the radar sensor may be built in the vehicle 100, for example, around the center in the left and right direction of the front bumper or in the front grill; and may transmit a detection wave in a predetermined range of angles in the left and right direction, and in the up and down direction around a predetermined axis (optical axis) as the center that extends ahead of the vehicle 100. Also, the camera sensor may be built in the vehicle 100, for example, around the center in the left and right direction of an upper part of the front window in the vehicle compartment; and may capture an image in a predetermined range of angles in the left and right direction, and in the up and down direction around an imaging direction as the center that extends ahead of the vehicle 100. Also, if the obstacle detection unit 10 is configured to include both the radar sensor and the camera sensor, the obstacle detection unit 10 may take advantage of both characteristics (strengths), to generate information (the distance to an obstacle, the relative speed of the obstacle, etc.) that integrates (fuses) the distance to the obstacle, the relative speed of the obstacle, etc., detected by both.

Also, the obstacle detection unit 10 identifies the type of a detected obstacle. The types of obstacles are set in advance depending on a predetermined classification of obstacles. Specifically, detection precision of the distance to an obstacle and the relative speed of the obstacle when being detected by the obstacle detection unit 10 (simply referred to as "detection precision of the obstacle detection unit 10" below), is classified into different types to be set. For example, the types of obstacles may include a "preceding vehicle" that corresponds to another vehicle existing ahead of the vehicle 100; a "pedestrian" that corresponds to a pedestrian existing ahead of the vehicle 100; and the like.

Note that the radar sensor (or a processing unit included in it) may identify the type of a detected obstacle, in accordance with a strength, a pattern (a frequency characteristic) and the like of a received reflected wave. Also, the camera sensor (or a processing unit included in it) may identify the type of a detected obstacle, by applying a known pattern matching process to a captured image.

The obstacle detection unit 10 is connected with the PCS-ECU 40 to communicate with each other via an in-vehicle LAN or the like, to transmit information (obstacle information) about a detected obstacle that includes the distance to the obstacle, the relative speed of the obstacle, and the type of the obstacle, to the PCS-ECU 40. Also, if not detecting an obstacle ahead of the vehicle 100, the obstacle detection unit 10 does not transmit obstacle information, or transmits information representing that an obstacle is not detected.

Note that if detecting multiple obstacles, the obstacle detection unit 10 may transmit obstacle information about an obstacle having the shortest distance from the vehicle 100 (namely, the obstacle having a highest emergency to be dealt with, as a target of drive support to avoid a collision), to the PCS-ECU 40.

Also, a part of functions in the obstacle detection unit 10 may be executed by a unit outside of the obstacle detection unit 10 (for example, the PCS-ECU 40). For example, the obstacle detection unit 10 may only detect an obstacle (by transmitting a detection wave by the radar sensor and receiving a reflected wave, and/or by capturing an image ahead of the vehicle 100 by the camera sensor), and the other processing functions may be executed by the PCS-ECU 40 that includes detecting (calculating) the distance to the obstacle and the relative speed of the obstacle, identifying the type of the obstacle, and the like.

The vehicle speed sensor 20 is a known vehicle speed detection unit to detect the vehicle speed of the vehicle 100. The vehicle speed sensor 20 is connected with the PCS-ECU 40 to communicate with each other via an in-vehicle LAN or the like, to transmit a signal that corresponds to a detected vehicle speed (vehicle speed signal), to the PCS-ECU 40.

The collision detection unit 30 is a collision detection unit to detect a collision with an obstacle ahead of the vehicle 100. The collision detection unit 30 may include, for example, an acceleration sensor to detect a steep change of acceleration of the vehicle 100; a distortion sensor to detect distortion of a front part of the vehicle 100; and a pressure sensor to detect a steep change of pressure in a pressure chamber disposed in the front bumper of the vehicle 100, and detects an occurrence of a collision with an obstacle in response to output signals of the sensors. The collision detection unit 30 is connected with the PCS-ECU 40 to communicate with each other via an in-vehicle LAN or the like, and if detecting an occurrence of a collision with an obstacle, transmits a signal that corresponds to the occurrence of the collision with the obstacle (collision signal) to the PCS-ECU 40.

Note that a part of functions in the collision detection unit 30 may be executed by a unit outside of the obstacle detection unit 10 (for example, the PCS-ECU 40). For example, the collision detection unit 30 may specialize in the sensor functions by the acceleration sensor, the distortion sensor, the pressure sensor, and the like; and detection (determination) of an occurrence of a collision with an obstacle may be executed by the PCS-ECU 40, based on detection signals from the sensors (the acceleration sensor, the distortion sensor, the pressure sensor, and the like) transmitted from the collision detection unit 30.

The PCS-ECU 40 is an electronic control unit to execute a main control process in the braking control apparatus 1. The PCS-ECU 40 may be configured with, for example, a microcomputer to execute various control processes by running various programs stored in a ROM on a CPU.

Note that the PCS-ECU 40 is connected with the obstacle detection unit 10, the vehicle speed sensor 20, the collision detection unit 30, the brake ECU 50, and the like to communicate with each other via an in-vehicle LAN or the like.

The PCS-ECU 40 calculates a TTC (time to collision) that corresponds to a time until the vehicle 100 collides with an obstacle ahead of it, in a circumstance where an obstacle is detected by the obstacle detection unit 10 (a circumstance where obstacle information is received from the obstacle detection unit 10). Specifically, based on obstacle information (the distance D to the obstacle and the relative speed V of the obstacle) received from the obstacle detection unit 10, the PCS-ECU 40 calculates the TTC (=D/V).

Note that the TTC may be calculated by considering the rate of change of the relative speed of an obstacle, namely, the relative acceleration of an obstacle with respect to the vehicle 100 (simply referred to as the "relative acceleration of an obstacle" below), and/or deceleration caused by a braking force of the vehicle 100 that is generated by intervention braking, which will be described later.

Also, to avoid a collision between an obstacle detected by the obstacle detection unit 10 and the vehicle 100, the PCS-ECU 40 executes a control process to generate a braking force of the vehicle 100 automatically based on a calculated TTC (starting the intervention braking). Specifically, if the calculated TTC is less than or equal to a predetermined time Tth1, the PCS-ECU 40 transmits a request for the intervention braking to the brake ECU 50 that directly controls the brake actuator 60 to generate a braking force of the vehicle 100. Here, "intervention" means executing irrespective of an operation by the driver, and "intervention braking" means an action to generate a braking force of the vehicle 100 automatically irrespective of an operation by the driver, and the same shall apply below. Note that the PCS-ECU 40 may execute a control process to generate a braking force of the vehicle 100 automatically, based on not only the TTC, but also a relative positional relationship between the vehicle 100 and an obstacle ahead (the distance D to the obstacle and the relative speed V of the obstacle). For example, based on the distance D to the obstacle and the relative speed V of the obstacle, the PCS-ECU 40 may determine whether a collision with the obstacle can be avoided by a driving operation (a steering operation, a braking operation, etc.). Then, if determining that a collision with the obstacle cannot be avoided by such a driving operation, the PCS-ECU 40 may execute a control process to generate a braking force of the vehicle 100 automatically. More specifically, assuming that a state of the relative speed V with respect to the obstacle continues, the PCS-ECU 40 may determine whether a collision with the obstacle can be avoided by a current steering operation to move the vehicle 100 in the left or right direction, before the distance D to the obstacle becomes zero. Also, assuming the same, the PCS-ECU 40 may determine whether a collision with the obstacle can be avoided by a current braking operation (whether the vehicle 100 can be decelerated to make the relative speed V zero or less).

Also, if a predetermined condition is satisfied in a state where a braking force of the vehicle 100 is generated by an intervention described above, the PCS-ECU 40 releases the state where the braking force is generated (releasing the intervention braking). Specifically, if the predetermined condition is satisfied, the PCS-ECU 40 transmits a request for releasing the intervention braking to the brake ECU 50. Control processes to start the intervention braking and to release the intervention braking by the PCS-ECU 40 will be described later in detail.

Also, incident to the control process to release the intervention braking, the PCS-ECU 40 calculates the distance to the obstacle (the estimated distance Dest) if the obstacle has gone out of detection in the state where the braking force of the vehicle 100 is generated by the intervention described above. Specifically, based on (a history of) the distance D to the obstacle and the relative speed V of the obstacle detected by the obstacle detection unit 10 before the obstacle has gone out of detection, the PCS-ECU 40 calculates the estimated distance Dest. For example, the PCS-ECU 40 may calculate the estimated distance Dest, based on the distance Dlast to the obstacle, the relative speed Vlast of the obstacle, and the relative acceleration α of the obstacle just before the obstacle has gone out of detection, and by using a calculation formula Dest=Dlast−∫(Vlast+αt)dt.

Note that the relative speed Vlast and the relative acceleration α of the obstacle just before going out of detection are assumed to be positive in the direction toward the vehicle 100 (namely, the rear direction). Also, the PCS-ECU 40 calculates the relative acceleration α of the obstacle just before going out of detection, based on a history of the relative speed V of the obstacle before going out of detection. Also, the PCS-ECU 40 may calculate the estimated distance Dest by considering a motional state of the vehicle 100 after the obstacle has gone out of detection (for example, change of deceleration of the vehicle 100 that corresponds to change of output from the brake actuator 60, and/or movement in the left and right direction of the vehicle 100 based on a steering operation, etc.).

Also, in a period during which an obstacle is detected, the PCS-ECU 40 may apply buffering to the obstacle information received from the obstacle detection unit 10, in an internal memory or the like. This makes it possible for the PCS-ECU 40 to access the internal memory, and to refer to the history of the distance D to the obstacle and the relative speed V of the obstacle detected by the obstacle detection unit 10 before the obstacle has gone out of detection.

Also, if receiving a collision signal from the collision detection unit 30 in a state where a braking force of the vehicle 100 is generated by an intervention described above (if the vehicle 100 collides with an obstacle), the PCS-ECU 40 has the state continue where the braking force of the vehicle 100 is generated automatically by the intervention, and continues to generate the braking force until the vehicle 100 stops. Specifically, if confirming that the vehicle 100 stops, based on a vehicle speed signal received from the vehicle speed sensor 20, the PCS-ECU 40 transmits a request for releasing the intervention braking to the brake ECU 50.

Note that if receiving a collision signal from the collision detection unit 30 in a state where a braking force of the vehicle 100 has not been generated by an intervention described above, the PCS-ECU 40 generates a braking force of the vehicle 100 automatically by an intervention, and continues to generate the braking force until the vehicle 100 stops. Namely, if receiving a collision signal from the collision detection unit 30, the PCS-ECU 40 transmits a request for the intervention braking to the brake ECU 50, and then, if confirming that the vehicle 100 stops, based on a vehicle speed signal received from the vehicle speed sensor 20, the PCS-ECU 40 transmits a request for releasing the intervention braking to the brake ECU 50.

Also, the PCS-ECU 40 may change a braking force appropriately to be generated automatically by an intervention described above. For example, the PCS-ECU 40 may control the brake actuator 60 via the brake ECU 50 to make the braking force greater stepwise or continuously while the TTC decreases in the range less than or equal to the threshold Tth1.

The brake ECU 50 is a control unit to control operational states of the brake apparatus in the vehicle 100 (the apparatus to generate a braking force for the vehicle 100), and controls the brake actuator 60 that makes, for example, hydraulic brake apparatuses operate, which are placed at wheels of the vehicle 100. The brake ECU 50 may be configured with, for example, a microcomputer to execute various control processes, which will be described later, by running various programs stored in a ROM on a CPU.

Note that the brake ECU 50 is connected with the PCS-ECU 40 to communicate with each other via an in-vehicle LAN or the like. Also, the brake ECU 50 is directly connected with the brake actuator 60 to communicate with each other.

The brake ECU 50 may execute a control process to determine output (wheel cylinder pressure) of the brake actuator 60, usually in response to a braking operation by the driver. For example, the brake ECU 50 may set pressure of the master cylinder (master cylinder pressure) that corresponds to a braking operation, to be the output of the brake actuator 60 (wheel cylinder pressure).

Also, in response to a request for the intervention braking received from the PCS-ECU 40, the brake ECU 50 executes a control process to generate a braking force of the vehicle 100 automatically (to generate a braking force of the vehicle 100 by the intervention). For example, by controlling the brake actuator 60, the brake ECU 50 has the brake actuator 60 generate assist pressure by the intervention in addition to the master cylinder pressure that corresponds to a braking operation by the driver, to output the wheel cylinder pressure having the master cylinder pressure and the assist pressure added together. Specifically, by controlling various valves, pumps, and the like included in the brake actuator 60, which will be described later, the brake ECU 50 has the brake actuator 60 generate the assist pressure, to output the wheel cylinder pressure having the master cylinder pressure and the assist pressure added together. This makes it possible to generate a braking force of the vehicle 100 automatically even if a braking operation is not performed by the driver (the master cylinder pressure is zero or very low).

Note that if the vehicle 100 is an electrically driven vehicle, the motor output (regenerative operation) may be controlled depending on a request for the intervention braking from the PCS-ECU 40, to generate a braking force of the vehicle 100 automatically.

Also, the PCS-ECU 40 and the brake ECU 50 may be arbitrarily implemented by hardware, software, or firmware, or a combination of these as long as the functions described above can be implemented. Also, a part of or all of the functions of the PCS-ECU 40 and the brake ECU 50 may be implemented by the other ECUs. For example, a part of or all of the functions of the PCS-ECU 40 may be implemented by the brake ECU 50, and a part of or all of the functions of the brake ECU 50 may be implemented by the PCS-ECU 40.

The brake actuator 60 is a unit to generate output that makes the brake apparatus in the vehicle 100 (for example, the hydraulic brake apparatus described above) operate. The brake actuator 60 may include, for example, a pump to generate high oil pressure (including a motor to drive the pump), various valves, and a hydraulic circuit, and may have an arbitrary configuration as long as the output can be raised (for example, boosting the wheel cylinder pressure) irrespective of an amount of a brake operation by the driver. Typically, the brake actuator 60 may include a high oil pressure source other than the master cylinder (a pump or an accumulator to generate comparatively high oil pressure), or may adopt a configuration that is used for a brake-by-wire system represented by an ECB (electronically controlled braking system).

Next, a characteristic control process of the braking control apparatus 1 according to the present embodiment, namely, a control process to start the intervention braking and to release the intervention braking will be described.

Figure 2:
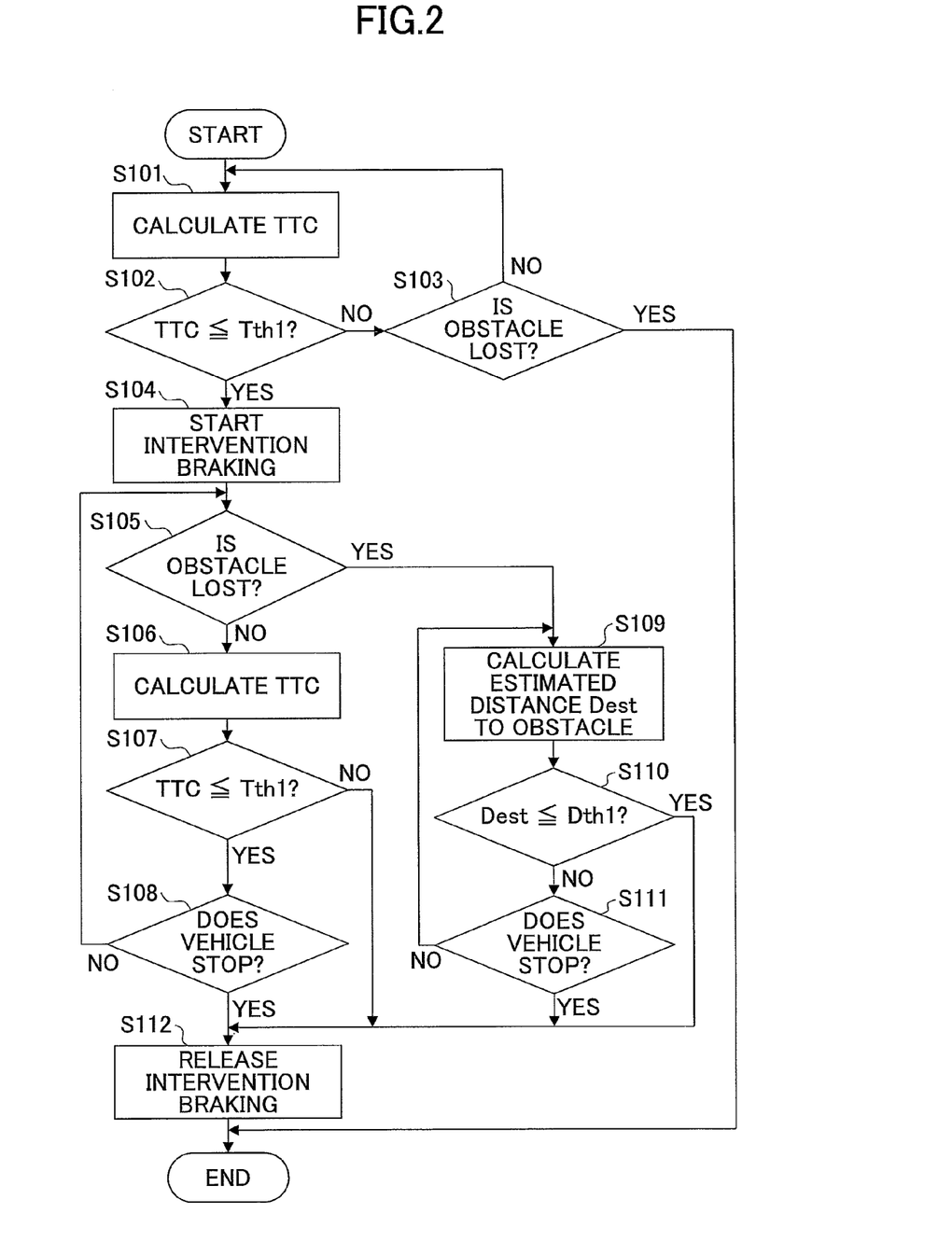
FIG. 2 is a flowchart that illustrates an example of a control process by a braking control apparatus (PCS-ECU) according to a first embodiment of the present invention.

FIG. 2 is a flowchart that illustrates an example of a control process to start the intervention braking and to release the intervention braking by the braking control apparatus 1 (PCS-ECU 40) according to the present embodiment. A process of the flowchart is executed every time an obstacle ahead of the vehicle 100 (an obstacle closest to the vehicle 100 if multiple obstacles are detected) is detected by the obstacle detection unit 10 (every time the PCS-ECU 40 starts receiving obstacle information transmitted from the obstacle detection unit 10). Also, if a collision with the obstacle is detected by the collision detection unit 30 during the execution of the process of the flowchart (the PCS-ECU 40 receives a collision signal from the collision detection unit 30), the PCS-ECU 40 terminates the process of the flowchart, and continues a state to generate a braking force of the vehicle 100 by the intervention until the vehicle 100 stops as described above.

Steps S101 to S104 correspond to a control process to start the intervention braking.

At Step S101, based on obstacle information (the distance D to the obstacle and the relative speed V of the obstacle) received from the obstacle detection unit 10, the PCS-ECU 40 calculates a TTC (=D/V).

At Step S102, the PCS-ECU 40 determines whether the TTC calculated at Step S101 is less than or equal to the predetermined time Tth1. If the TTC is less than or equal to the predetermined time Tth1, the process goes forward to Step S104; or if the TTC is not less than or equal to the predetermined time Tth1, the process goes forward to Step S103.

At Step S103, the PCS-ECU 40 determines whether the obstacle has gone out of detection (the obstacle is lost) by the obstacle detection unit 10. If the obstacle has not gone out of detection (namely, the obstacle is continuously detected), the process goes back to Step S101; or if the obstacle has gone out of detection, the current process ends.

On the other hand, at Step S104, the PCS-ECU 40 starts a process to generate a braking force of the vehicle 100 by the intervention (starting the intervention braking). Specifically, the PCS-ECU 40 transmits a request for the intervention braking to the brake ECU 50 as described above.

In this way, as long as an obstacle is continuously detected, the braking control apparatus according to the present embodiment monitors whether the TTC is less than or equal to the predetermined time Tth1, and if the TTC is less than or equal to the predetermined time Tth1, generates a braking force of the vehicle 100 automatically by the intervention to avoid a collision with the obstacle.

Next, Steps S105 to S112 correspond to a control process to release the intervention braking.

At Step S105, the PCS-ECU 40 determines whether the obstacle has gone out of detection (the obstacle is lost). If the obstacle has not gone out of detection (namely, the obstacle is continuously detected), the process goes forward to Step S106; or if the obstacle has gone out of detection, the process goes forward to Step S109.

At Step S106, based on obstacle information (the distance D to the obstacle and the relative speed V of the obstacle) received from the obstacle detection unit 10, the PCS-ECU 40 calculates a TTC (=D/V).

At Step S107, the PCS-ECU 40 determines whether the TTC calculated at Step S106 is less than or equal to the predetermined time Tth1 (whether a state continues where the TTC is less than or equal to the predetermined time Tth1). If the TTC is less than or equal to the predetermined time Tth1, the process goes forward to Step S108; or if the TTC is not less than or equal to the predetermined time Tth1, the process goes forward to Step S112.

At Step S108, the PCS-ECU 40 determines whether the vehicle 100 stops based on a vehicle speed signal from the vehicle speed sensor 20. If the vehicle 100 stops, the process goes forward to Step S112; or if the vehicle 100 does not stop, the process goes back to Step S105.

On the other hand, at Step S109, based on (a history of) the distance D to the obstacle and the relative speed V of the obstacle detected by the obstacle detection unit 10 before the obstacle has gone out of detection as described above, the PCS-ECU 40 calculates an estimated distance Dest to the obstacle that has gone out of detection.

At Step S110, the PCS-ECU 40 determines whether the estimated distance Dest to the obstacle gone out of detection calculated at Step S110 is less than or equal to the threshold Dth1 that is set less than zero. Namely, by determining whether the estimated distance Dest is less than or equal to the threshold Dth1 (<0), the PCS-ECU 40 determines whether the vehicle has reached the obstacle gone out of detection. If the estimated distance Dest is less than or equal to the threshold Dth1, the PCS-ECU 40 determines that the vehicle has reached the obstacle gone out of detection without detecting a collision, and the process goes forward to Step S112; if the estimated distance Dest is not less than or equal to the threshold Dth1, the PCS-ECU 40 determines that the vehicle has not yet reached the obstacle gone out of detection, and the process goes forward to Step S111.

At Step S111, the PCS-ECU 40 determines whether the vehicle 100 has stopped, based on a vehicle speed signal from the vehicle speed sensor 20. If the vehicle 100 has stopped, the process goes forward to Step S112; or if the vehicle 100 has not stopped, the process goes back to Step S109.

At Step S112, the PCS-ECU 40 executes a process to release the state to generate the braking force of the vehicle 100 by the intervention, and the current process ends (releasing the intervention braking). Specifically, the brake ECU 50 transmits a request for releasing the intervention braking as described above, and the current process ends.

As illustrated in Steps S105 to S108 and Step S112, while an obstacle is being detected by the obstacle detection unit 10 in a state where a braking force of the vehicle 100 by the intervention is generated, if the TTC becomes greater than the predetermined time Tth1 (NO in Step S107), the braking control apparatus 1 according to the present embodiment releases the state to generate the braking force of the vehicle 100 by the intervention. This is because a collision with the obstacle is successfully avoided. Also, this is the same if the vehicle 100 stops.

Note that if the PCS-ECU 40 executes a control process to generate a braking force of the vehicle 100 automatically, based on not only the TTC, but also a relative positional relationship between the vehicle 100 and an obstacle ahead (the distance D to the obstacle and the relative speed V of the obstacle), substantially the same method may be applied to release the state to generate the braking force. Namely, while an obstacle is being detected by the obstacle detection unit 10 in a state where a braking force of the vehicle 100 by the intervention is generated, if the condition is not satisfied anymore to generate the braking force of the vehicle 100 by the intervention, the braking control apparatus 1 according to the present embodiment may release the state to generate the braking force of the vehicle 100 by the intervention. Also, this is the same if the vehicle 100 stops.

Also, as illustrated in Steps S109 to S112, if an obstacle has gone out of detection by the obstacle detection unit 10 in a state where a braking force of the vehicle 100 is generated by the intervention, the braking control apparatus 1 according to the present embodiment repeatedly calculates the estimated distance Dest, to determine whether the estimated distance Dest is less than or equal to the threshold Dth1. Then, if the estimated distance Dest is less than or equal to the threshold Dth1, the braking control apparatus 1 releases the state to generate the braking force of the vehicle 100 by the intervention. Also, this is the same if the vehicle 100 stops during a process to repeatedly determine whether the estimated distance Dest is less than or equal to the threshold Dth1.

Here, using FIG. 3, a situation will be described where the control process illustrated in FIG. 2 functions effectively.

Figure 3A:
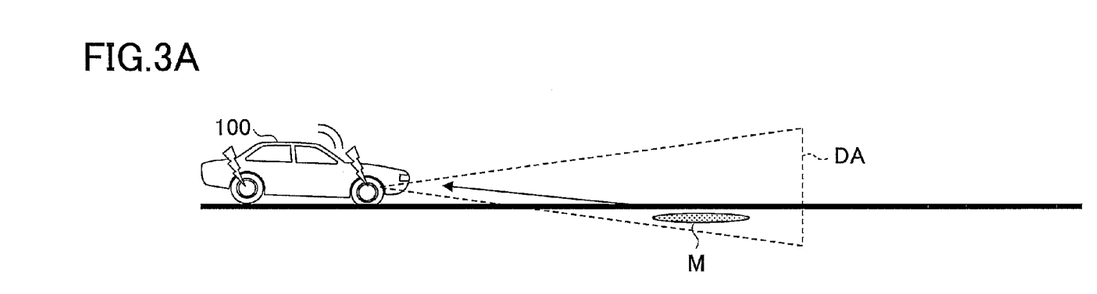
FIGS. 3A-3C are diagrams that illustrate operations of a braking control apparatus according to the first embodiment.
Figure 3B:
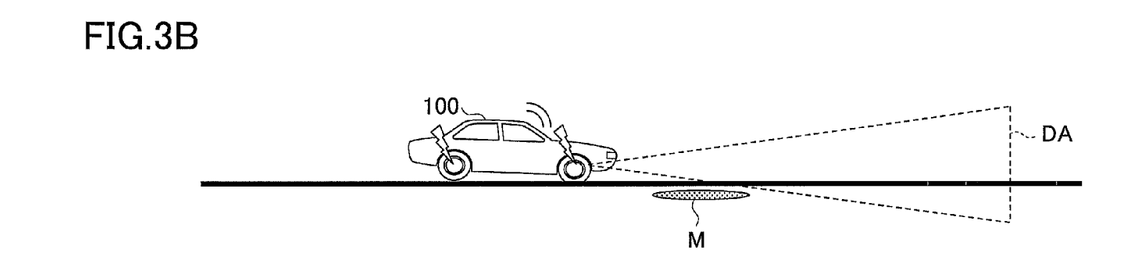
Figure 3C:
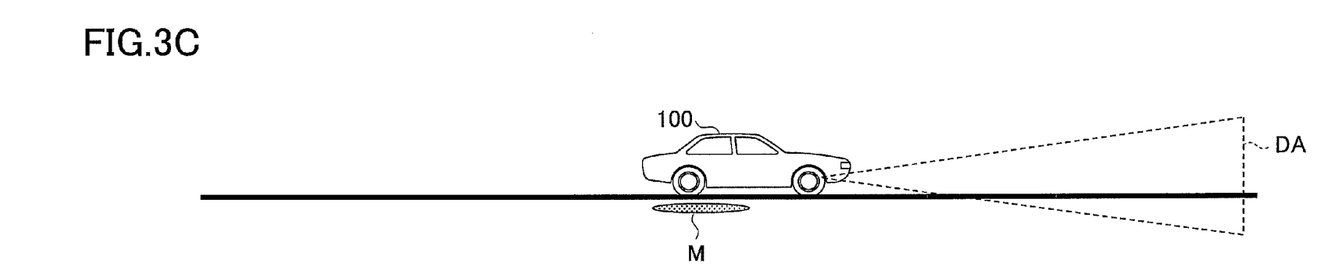

FIGS. 3A-3C are diagrams that illustrate operations of the braking control apparatus 1 according to the present embodiment. The diagrams specifically illustrates a situation where a cover M of a manhole made of iron on a road surface is erroneously detected as an obstacle by the obstacle detection unit 10; the vehicle 100 transitions into a state where a braking force of the vehicle 100 is generated by an intervention; and then, the state where the braking force is generated by the intervention is released. FIG. 3A illustrates a circumstance where the cover M of the manhole comes into the detection range DA of the obstacle detection unit 10 while the vehicle 100 is traveling, and the obstacle detection unit 10 erroneously detects the cover M of the manhole as an obstacle. Also, FIG. 3B illustrates a circumstance where the cover M of the manhole has gone out of the detection range DA of the obstacle detection unit 10, and the cover M of the manhole is not detected as an obstacle by the obstacle detection unit 10 anymore. FIG. 3C illustrates a circumstance where the vehicle 100 has reached the cover M of the manhole that has been detected as an obstacle by the obstacle detection unit 10 (the vehicle 100 is passing over the cover M of the manhole).

As illustrated in FIG. 3A, if the cover M of the manhole is erroneously detected as an obstacle by the obstacle detection unit 10, the PCS-ECU 40 repeatedly calculates the TTC, to determine whether the TTC is less than or equal to the threshold Tth1. Then, since the cover M of the manhole is stationary, the TTC becomes less than or equal to the predetermined time Tth1 at a certain moment, and the PCS-ECU 40 generates a braking force of the vehicle 100 automatically by the intervention (starting the intervention braking) as described above.

When the vehicle 100 further approaches the cover M of the manhole in the circumstance of FIG. 3A, as illustrated in FIG. 3B, the cover M of the manhole goes into the dead angle of the obstacle detection unit 10, and the cover M of the manhole is not detected as an obstacle by the obstacle detection unit 10 anymore. Then, the PCS-ECU 40 repeatedly calculates the estimated distance Dest to the cover M of the manhole gone out of detection, to determine whether the estimated distance Dest is less than or equal to the threshold Dth1 (<0) as described above.

While the vehicle 100 further approaches the cover M of the manhole in the circumstance of FIG. 3B, the estimated distance Dest calculated by the PCS-ECU 40 becomes even less. Then, as illustrated in FIG. 3C, when the vehicle 100 reaches the installed position of the cover M of the manhole, and passes over the installed position, the estimated distance Dest becomes less than or equal to the threshold Dth1. Therefore, while passing over the the cover M, the PCS-ECU 40 releases the state to generate the braking force of the vehicle 100 by the intervention (releasing the intervention braking) as described above. Therefore, the vehicle 100, which has been in a state about to stop, can resume normal traveling.

In this way, even if erroneously detecting an object as an obstacle, which is not a target to avoid a collision such as the cover of a manhole, and having generated a braking force of the vehicle 100 by the intervention, the braking control apparatus 1 according to the present embodiment determines that the vehicle 100 reaches and passes over the erroneously detected target, and releases the state to generate the braking force. Specifically, if the erroneously detected target goes out of detection when getting into the dead angle of the obstacle detection unit 10, the braking control apparatus 1 calculates the estimated distance Dest, and determines whether the estimated distance Dest is less than or equal to the threshold Dth1 (<0), to determine whether the vehicle 100 reaches the erroneously detected target, and depending on the determination, to release the state to generate the braking force. Therefore, the vehicle 100 can promptly resume normal traveling if it has not come to stop after passing over the erroneously detected target.

Also, the braking control apparatus 1 according to the present embodiment exhibits substantially the same operational effects as in the case of erroneous detection described above if an obstacle (a preceding vehicle or the like) takes an action to avoid a collision such as a lane change or acceleration after the obstacle has gone out of detection in a state where a braking force of the vehicle 100 by the intervention is generated. Namely, after the obstacle has gone out of detection, if a collision is avoided by an action to avoid a collision described above, the braking control apparatus 1 can determine that a collision has been avoided if the estimated distance Dest is less than or equal to the threshold Dth1 (<0), which is calculated based on a relative relationship between the vehicle 100 and the obstacle before the obstacle has gone out of detection. Therefore, the vehicle 100 can promptly resume normal traveling if the vehicle 100 has not come to stop at a moment when the estimated distance Dest is less than or equal to the threshold Dth1.

Also, if an obstacle goes into the dead angle of the obstacle detection unit 1, and is not detected by the obstacle detection unit 10, in a state where the braking force of the vehicle 100 by the intervention is generated, the braking control apparatus 1 continues the state to generate the braking force until the estimated distance Dest is less than or equal to the threshold Dth1. Therefore, if the obstacle detected by the obstacle detection unit 10 is a target to avoid a collision, the operational state of the brake apparatus continues until the vehicle 100 reaches the obstacle, and hence, the braking control apparatus 1 can avoid a collision with the obstacle appropriately. Namely, while continuing the operational state of the brake apparatus by the intervention to avoid a collision with the obstacle, the braking control apparatus 1 can release the operational state of the brake apparatus by the intervention by appropriately determining that a collision with the obstacle gone out of detection has been avoided, or that the operation of the brake apparatus by the intervention has been executed by erroneous detection of the obstacle.

Also, for example, even if the estimated distance Dest is calculated to be less than the actual distance to the obstacle, by appropriately setting the threshold Dth1 to be less than zero, the estimated distance Dest is not less than or equal to the threshold Dth1 before reaching the obstacle gone out of detection. Namely, depending on an expected error about the estimated distance Dest, by appropriately setting the threshold Dth1 to be less than zero, a state to generate a braking force of the vehicle 100 by the intervention is not released before reaching the obstacle gone out of detection. Therefore, the braking control apparatus 1 can release the operational state of the brake apparatus by the intervention, by appropriately determining that a collision with the obstacle gone out of detection has been avoided, or that the operation of the brake apparatus by the intervention has been executed by erroneous detection of the obstacle.

Here, using FIGS. 4A-4C, a method of setting (changing) the threshold Dth1 to release the intervention braking by the braking control apparatus 1 (the PCS-ECU 40) according to the present embodiment, will be described.

Figure 4A:
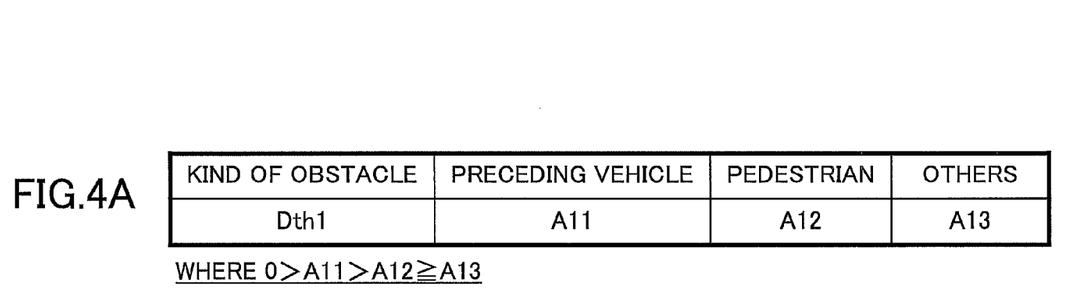
FIGS. 4A-4C are diagrams that illustrate a specific example of a method of setting (changing) a threshold to release intervention braking by a braking control apparatus (PCS-ECU)
Figure 4B:
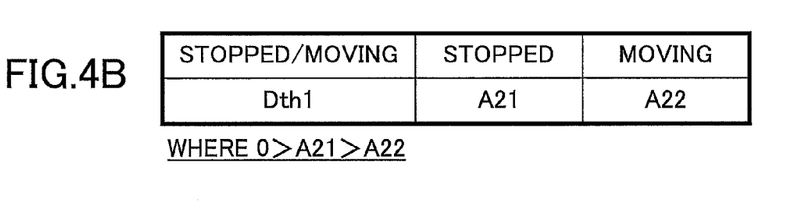
Figure 4C:
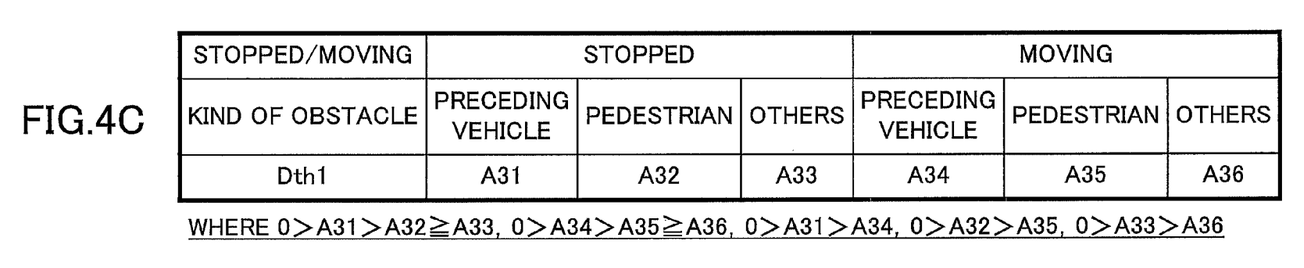

FIGS. 4A-4C are diagrams that illustrate a specific example of a method of setting (changing) the threshold Dth1 to release the intervention braking by the braking control apparatus 1 (the PCS-ECU 40) according to the present embodiment. FIG. 4A is a diagram that illustrates an example of a method of setting (changing) the threshold Dth1. Specifically, the diagram illustrates an example to change the threshold Dth1 depending on the type of an obstacle described above. FIG. 4B is a diagram that illustrates another example of a method of setting (changing) the threshold Dth1. Specifically, the diagram illustrates an example to change the threshold Dth1 depending on whether an obstacle stops or moves. FIG. 4C is a diagram that illustrates yet another example of a method of setting (changing) the threshold Dth1. Specifically, the diagram illustrates an example to change the threshold Dth1 depending on the type of an obstacle described above, and whether an obstacle stops or moves.

Note that predetermined values A11 to A13 in FIG. 4A satisfy 0>A11>A12≧A13. Also, predetermined values A21 and A22 in FIG. 4B satisfy 0>A21>A22. Also, predetermined values A31 to A36 in FIG. 4C satisfy 0>A31>A32≧A33, 0>A34>A35≧A36, 0>A31>A34, 0>A32>A35, and 0>A33>A36. Also, at a timing to start the control process of the flowchart in FIG. 2, the PCS-ECU 40 may concurrently execute a process to set the threshold Dth1 based on the setting method illustrated in FIGS. 4A-4C. Also, at a timing when the control process of the flowchart in FIG. 2 goes to Step S109, the PCS-ECU 40 may concurrently execute a process to set the threshold Dth1 based on the setting method illustrated in in FIGS. 4A-4C.

First, referring to FIG. 4A, the types of obstacles are set in advance that include the "preceding vehicle" that corresponds to another vehicle existing ahead of the vehicle 100; the "pedestrian" that corresponds to a pedestrian existing ahead of the vehicle 100; and the "others" that correspond to obstacles not classified as the "preceding vehicle" or the "pedestrian". In addition, predetermined values A11, A12, and A13 are set as values of the threshold Dth1 that correspond to these types ("preceding vehicle", "pedestrian", "others") set as above, respectively.

Note that if an obstacle is a "pedestrian", detection precision of the obstacle detection unit 10 tends to be lower, compared to a case where an obstacle is a "preceding vehicle". Specifically, if using a radar sensor, the strength of a reflected wave from a pedestrian is less than the strength of a reflected wave from a preceding vehicle, and is susceptible to noise or disturbance. Therefore, the detection precision by the obstacle detection unit (radar sensor) tends to be reduced if the obstacle is a "pedestrian", compared to a case where the obstacle is a "preceding vehicle". Also, if using a camera sensor, a captured image of a pedestrian includes fewer edge components for edge detection than that of preceding vehicle, and precision to identify a range that corresponds to the pedestrian in the captured image is reduced, as influenced by the color of shoes, the color of trousers, angles of legs, the color of a road surface, and the like. Therefore, the detection precision by the obstacle detection unit 10 (camera sensor) tends to be reduced if the obstacle is a "pedestrian", compared to a case where the obstacle is a "preceding vehicle". Namely, since the estimated distance Dest to an obstacle gone out of detection is calculated based on the distance D to the obstacle and the relative speed V of the obstacle before the obstacle has gone out of detection, calculation precision of the estimated distance Dest in a case where the obstacle is a "pedestrian" is consequently reduced compared to a case where the obstacle is a "preceding vehicle".

Therefore, the estimated distance Dest in a case where the obstacle is a "pedestrian" is greater compared to a case where the obstacle is a "preceding vehicle". Therefore, the threshold Dth1 (=predetermined value A12) in a case where the obstacle is a "pedestrian" is set less (so that the amount of offset from zero is greater) than the threshold Dth1 (=predetermined value A11) in a case of a "preceding vehicle". Thus, for either a case where the obstacle is a "pedestrian", or a case where the obstacle is a "preceding vehicle", it is possible to determine adjustably and more appropriately that a collision with the obstacle gone out of detection has been avoided, or that the operation of the brake apparatus by the intervention has been executed by erroneous detection of the obstacle.

Note that, in the present embodiment, an expected error of the estimated distance Dest in a case where an obstacle is classified as the "others", is assumed to be greater than or equal to an expected error of the estimated distance Dest in a case of "pedestrian". Therefore, the threshold Dth1 (=predetermined value A13) in a case where an obstacle is the "others", is set less than or equal to the threshold Dth1 (=predetermined value A12) in a case where an obstacle is a "pedestrian". Also, the cover of a manhole of a road surface described above may be included in the "others".

Also, depending on detection precision of the distance D to an obstacle and the relative distance V to the obstacle by the obstacle detection unit 10, obstacles may be further finely classified, to set a greater number of types of obstacles. For example, the "preceding vehicle" may be further classified into the "automobile" that corresponds to another vehicle existing ahead of the vehicle 100; and the "two wheeled vehicle" that corresponds to a motorcycle, a bicycle, or the like. Also, the "animal" and the like, may be set in addition to the "pedestrian". In this case, detection precision of the distance D to an obstacle and the relative distance V to the obstacle by the obstacle detection unit 10 in a case where the obstacle is the "two wheeled vehicle", is higher than in a case where the obstacle is a "pedestrian", but lower than in a case where the obstacle is the "automobile". Therefore, the threshold Dth1 in a case where the obstacle is the "two wheeled vehicle" may be set less than in a case where the obstacle is the "automobile", and greater than in a case where the obstacle is a "pedestrian". Also, detection precision of the distance D to an obstacle and the relative distance V to the obstacle by the obstacle detection unit 10 in a case where the obstacle is the "animal", is further lower than in a case where the obstacle is a "pedestrian". Therefore, the threshold Dth1 in a case where the obstacle is the "animal" may be set further less than in a case where the obstacle is the "pedestrian".

In this way, in the present embodiment, the threshold Dth1 is set based on the type of an obstacle that is identified depending on detection precision of the distance D to the obstacle and the relative distance V to the obstacle by the obstacle detection unit 10. Specifically, while the detection precision by the obstacle detection unit is lower depending on the type of an obstacle, the threshold Dth1 (<0) is set to be less (so that the amount of offset from zero is greater). Thus, the threshold Dth1 can be set adjusted for the expected error of the estimated distance Dest that may change depending on the type of an obstacle. Therefore, the braking control apparatus 1 according to the present embodiment can determine more appropriately that the vehicle 100 reaches an obstacle, namely, that a collision with the obstacle gone out of detection has been avoided, or that the operation of the brake apparatus by the intervention has been executed by erroneous detection of the obstacle.

Next, referring to FIG. 4B, the threshold Dth1 is changed in the present embodiment, based on whether an obstacle detected by the obstacle detection unit 10 stops or moves.

If an obstacle moves, after the obstacle has gone into the dead angle of the obstacle detection unit 10, and gone out of detection, there is a likelihood that the obstacle may change a stable motional state by acceleration or deceleration. Therefore, precision of the estimated distance Dest calculated based on (a history of) the distance D to the obstacle and the relative speed V of the obstacle gone out of detection, is worse for the obstacle when it moves than when it stops.

Therefore, the expected error of the estimated distance Dest in a case where an obstacle moves is greater than in a case where an obstacle stops, and hence, threshold Dth1 (=predetermined value A22) in a case where an obstacle moves is set less than the threshold Dth1 (=predetermined value A21) in a case where an obstacle stops (so that the amount of offset from zero is greater). Thus, the threshold Dth1 can be set adjusted for the expected error of the estimated distance Dest that may change depending on an obstacle moves or stops. Therefore, the braking control apparatus 1 according to the present embodiment can determine more appropriately that the vehicle 100 reaches an obstacle, namely, that a collision with the obstacle gone out of detection has been avoided, or that the operation of the brake apparatus by the intervention has been executed by erroneous detection of the obstacle.

Next, referring to FIG. 4C, this is an example that combines those of FIGS. 4A and 4B. Namely, depending on an obstacle stops or moves, and the type of the obstacle which is either of the "preceding vehicle", "pedestrian", or the "others", the threshold Dth1 is set to one of six predetermined values A31 to A36.

A specific changing method of the threshold Dth1 is substantially the same as in the examples in FIGS. 4A and 4B described above. For example, if an obstacle stops, the threshold Dth1 is set less (so that the amount of offset from zero is greater) in a case where the obstacle is a "pedestrian" (=predetermined value A32) than in a case where the obstacle is a "preceding vehicle" (=predetermined value A31). Also, if an obstacle is a "preceding vehicle", the threshold Dth1 is set less (so that the amount of offset from zero is greater) in a case where the obstacle stops (=predetermined value A31) than in a case where the obstacle moves (=predetermined value A34).

In this way, by using the changing method of the threshold Dth1 that combines the examples illustrated in FIGS. 4A and 4B, the braking control apparatus 1 according to the present embodiment can exhibit the operational effects of both examples in FIGS. 4A and 4B.

Second Embodiment

Next, a second embodiment will be described.

A braking control apparatus 1 according to the present embodiment releases a state to generate a braking force of the vehicle 100 automatically by the intervention if a distance Dlast to an obstacle just before going out of detection satisfies a predetermined condition. In this regard, the braking control apparatus 1 the present embodiment is different from that in the first embodiment. In the following, the same elements as in the first embodiment are assigned the same numerical codes, and different elements will be mainly described.

Note that a configuration of the braking control apparatus 1 according to the present embodiment can be represented by FIG. 1 as in the first embodiment, and its description is omitted.

Figure 5:
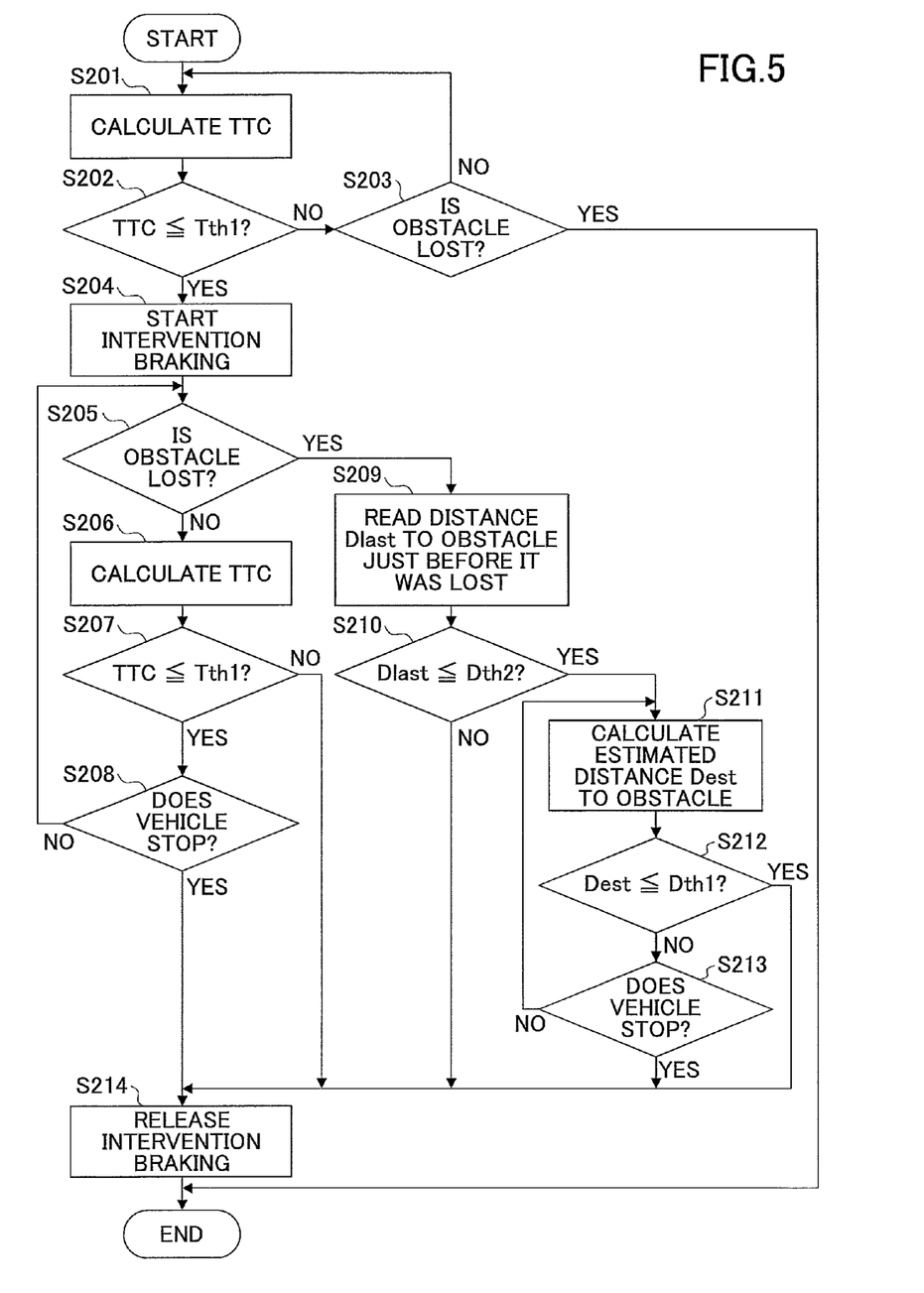
FIG. 5 is a flowchart that illustrates an example of a control process by a braking control apparatus (PCS-ECU) according to a second embodiment of the present invention.

FIG. 5 is a flowchart that illustrates an example of a control process to start the intervention braking and to release the intervention braking by the braking control apparatus 1 (the PCS-ECU 40) according to the present embodiment. A process of the flowchart is executed every time an obstacle ahead of the vehicle. 100 (an obstacle closest to the vehicle 100 if multiple obstacles are detected) is detected by the obstacle detection unit 10 (every time the PCS-ECU 40 starts receiving obstacle information transmitted from the obstacle detection unit 10). Also, if a collision with an obstacle is detected by the collision detection unit during the execution of the process of the flowchart (the PCS-ECU 40 receives a collision signal from the collision detection unit 30), the PCS-ECU 40 terminates the process of the flowchart, and continues a state to generate a braking force of the vehicle 100 by the intervention until the vehicle 100 stops as described above.

Note that Steps S201 to S204 that correspond to a control process to start the intervention braking are the same as Steps S101 to S104 in FIG. 2 in the first embodiment, and their description is omitted. Steps S205 to S214 that correspond to a control process to release the intervention braking will be described.

At Step S205, the PCS-ECU 40 determines whether the obstacle has gone out of detection (the obstacle is lost). If the obstacle has not gone out of detection (namely, the obstacle is continuously detected), the process goes forward to Step S206; or if the obstacle has gone out of detection, the process goes forward to Step S209.

Note that Steps S206 to S208 are the same as Steps S106 to S108 in FIG. 2 in the first embodiment, and their description is omitted.

At Step S209, the PCS-ECU 40 reads the distance Dlast to the obstacle just before the obstacle has gone out of detection, from an internal memory or the like.

At Step S210, the PCS-ECU 40 determines whether the distance Dlast to the obstacle just before the obstacle has gone out of detection is less than or equal to at threshold Dth2. If the distance Dlast to the obstacle just before the obstacle has gone out of detection is less than or equal to the threshold Dth2, the process goes forward to Step S211; or if it is not less than or equal to the threshold Dth2, the process goes forward to Step S214.

Note that Steps S211 to S213 are the same as Steps S109 to S111 in FIG. 2 in the first embodiment, and their description is omitted.

At Step S214, the PCS-ECU 40 executes a process to release the state to generate the braking force of the vehicle 100 by the intervention, and the current process ends (releasing the intervention braking). Specifically, the brake ECU 50 transmits a request for releasing the intervention braking as described above, and the current process ends.

In this way, if an obstacle has gone out of detection after having started the intervention braking, the braking control apparatus 1 according to the present embodiment releases the state to generate the braking force of the vehicle 100 automatically by the intervention if a condition that the distance Dlast to the obstacle is not less than or equal to the threshold Dth2 (>0), is satisfied.

Note that the threshold Dth2 is set to determine whether the obstacle has gone into the dead angle of the obstacle detection unit 10, and is not detected anymore. For example, the threshold Dth2 may be set as a limit distance (for example, 2 m) for the obstacle detection unit 10 to be capable of detecting an obstacle that is close to the vehicle 100.

Namely, if an obstacle goes out of detection in a state where it is close to the vehicle 100 to a certain extent, it can be determined that the obstacle goes into the dead angle of the obstacle detection unit 10. Therefore, similarly to the first embodiment, if the distance Dest to the obstacle gone out of detection is less than or equal to the threshold Dth1, the PCS-ECU 40 releases a state where state the braking force of the vehicle 100 is generated by the intervention.

On the other hand, if an obstacle goes out of detection in a state where it is not so close to the vehicle 100, it implies that the obstacle (a preceding vehicle or the like) takes an action to avoid a collision such as a lane change or acceleration, and goes out of the detection range of the obstacle detection unit 10. Therefore, if determining that the distance Dlast to an obstacle just before the obstacle has gone out of detection is not less than or equal to the threshold Dth2, the PCS-ECU 40 determines that a collision with the obstacle is avoided, and immediately releases the state to generate the braking force of the vehicle 100 by the intervention. Thus, the braking control apparatus 1 according to the present embodiment can promptly make the vehicle 100 resume normal traveling if the obstacle takes an action to avoid a collision, and goes away from the detection range of the obstacle detection unit 10.

Note that the braking control apparatus 1 according to the present embodiment uses the distance Dlast to an obstacle just before the obstacle has gone out of detection, to directly determine whether the obstacle has gone out of detection in a state where it is close to the vehicle 100 to a certain extent. However, the braking control apparatus 1 may use the TTC just before the obstacle has gone out of detection, to determine the same. In the following, a modified example will be described that uses the TTC just before an obstacle goes out of detection.

Figure 6:
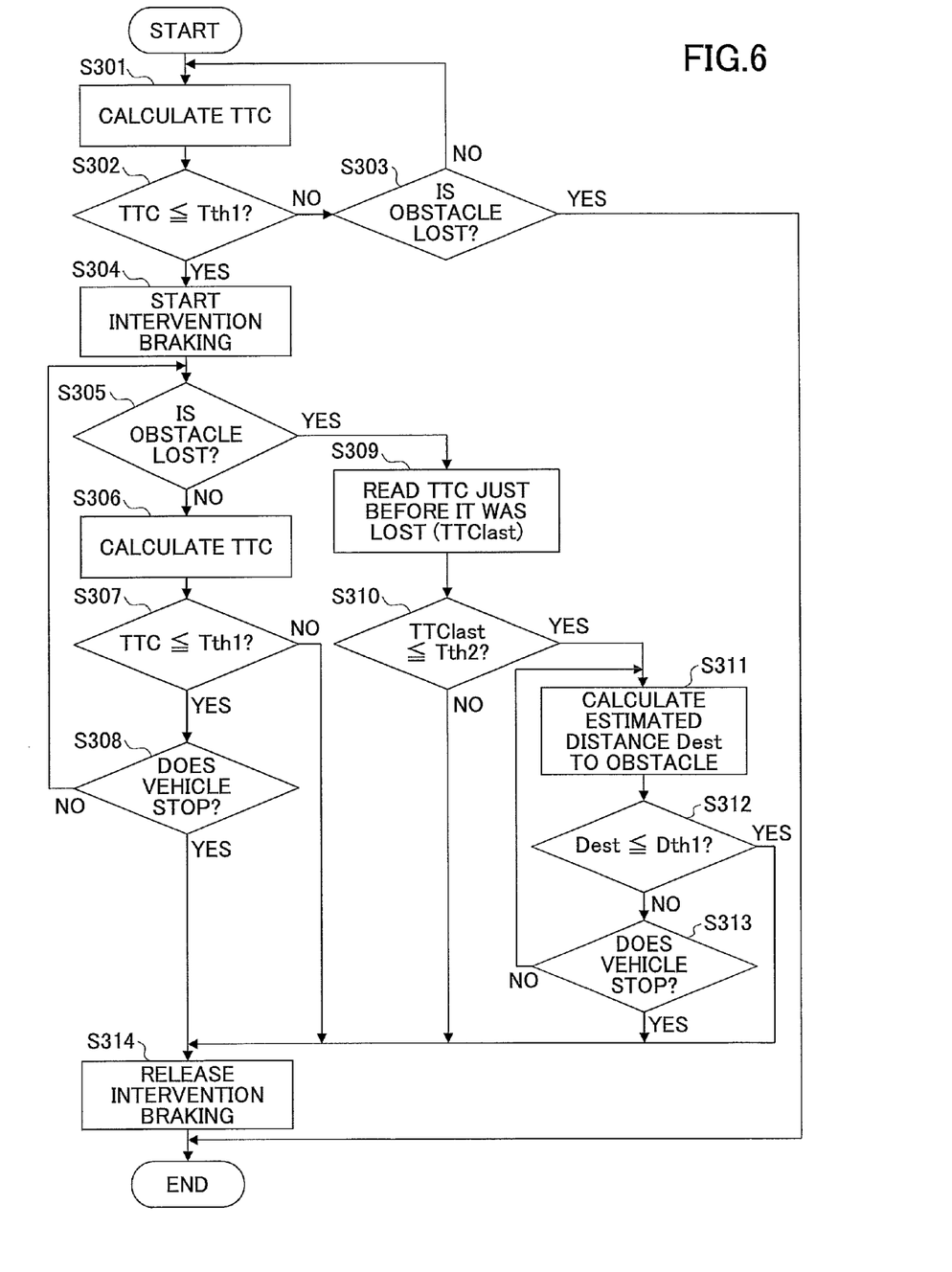
FIG. 6 is a flowchart that illustrates an example of a control process by a braking control apparatus (PCS-ECU) according to a modified example of the second embodiment of the present invention.

FIG. 6 is a flowchart that illustrates an example of a control process to start the intervention braking and to release the intervention braking by the braking control apparatus 1 according to a modified example of the present embodiment. A process of the flowchart is executed every time an obstacle ahead of the vehicle 100 (an obstacle closest to the vehicle 100 if multiple obstacles are detected) is detected by the obstacle detection unit 10 (every time the PCS-ECU 40 starts receiving obstacle information transmitted from the obstacle detection unit 10). Also, if a collision with an obstacle is detected by the collision detection unit during the execution of the process of the flowchart (the PCS-ECU 40 receives a collision signal from the collision detection unit 30), the PCS-ECU 40 terminates the process of the flowchart, and continues a state to generate a braking force of the vehicle 100 by the intervention until the vehicle 100 stops as described above.

Note that Steps S301 to S304 that correspond to a control process to start the intervention braking are the same as Steps S201 to S204 in FIG. 5, and their description is omitted. Steps S305 to S314 that correspond to a control process to release the intervention braking will be described.

At Step S305, the PCS-ECU 40 determines whether the obstacle has gone out of detection (the obstacle is lost). If the obstacle has not gone out of detection (namely, the obstacle is continuously detected), the process goes forward to Step S306; or if the obstacle has gone out of detection, the process goes forward to Step S309.

Note that Steps S306 to S308 are the same as Steps S206 to S208 in FIG. 5, and their description is omitted.

At Step S309, the PCS-ECU 40 reads a TTC (TTClast) just before the obstacle has gone out of detection, from an internal memory or the like.

Note that the PCS-ECU 40 may apply buffering to the TTC calculated at Step S306 in an internal memory, to read out the TTC (TTClast) just before the obstacle has gone out of detection from the internal memory appropriately.

At Step S310, the PCS-ECU 40 determines whether the TTC (TTClast) just before the obstacle has gone out of detection is less than or equal to the predetermined time Tth2 that is set less than the predetermined time Tth1. If the TTC (TTClast) just before the obstacle has gone out of detection is less than or equal to the predetermined time Tth2, the process goes forward to Step S311; or if it is not less than or equal to the predetermined time Tth2, the process goes forward to Step S314.

Note that Steps S311 to S313 are the same as Steps S211 to S213 in FIG. 5, and their description is omitted.

At Step S314, the PCS-ECU 40 executes a process to release the state to generate the braking force of the vehicle 100 by the intervention, and the current process ends (releasing the intervention braking). Specifically, the brake ECU 50 transmits a request for releasing the intervention braking as described above, and the current process ends.

In this way, the braking control apparatus according to the modified example determines whether the obstacle has gone out of detection in a state where it is close to the vehicle 100 to a certain extent, by determining whether the TTC (TTClast) just before the obstacle has gone out of detection is less than or equal to the predetermined time Tth2 that is set less than the predetermined time Tth1. Then, if the TTC (TTClast) just before the obstacle has gone out of detection is not less than or equal to predetermined time Tth2, the braking control apparatus 1 determines that a collision with the obstacle is avoided, and immediately releases the state to generate the braking force of the vehicle 100 by the intervention. Thus, the braking control apparatus 1 according to the modified example can promptly make the vehicle 100 resume normal traveling if the obstacle takes an action to avoid a collision, and goes away from the detection range of the obstacle detection unit 10.

The embodiments of the present invention have been described in detail. Note that the present invention is not limited to the above specific embodiments, but various changes, substitutions, and alterations could be made without departing from the spirit and scope of the present invention.

The present application is based on and claims the benefit of priority of Japanese Priority Application No. 2014-266316, filed on Dec. 26, 2014, the entire contents of which are hereby incorporated by reference.

The invention claimed is:

1. A vehicle braking control apparatus comprising:
   an obstacle detection unit configured to detect (i) an obstacle ahead of a vehicle, (ii) a distance to the obstacle from the vehicle, and (iii) a relative speed of the obstacle with respect to the vehicle;
   a time to collision calculation unit configured to calculate a time to collision until the vehicle collides with the obstacle, based on the distance and the relative speed;

an estimated distance calculation unit configured to calculate, when the obstacle has gone out of a detection range of the obstacle detection unit, an estimated distance to the obstacle from the vehicle, at least based on the distance and the relative speed before the obstacle has gone out of the detection range of the obstacle detection unit; and a braking control unit configured to generate a braking force of the vehicle automatically when the time to collision is less than or equal to a predetermined time, and when the obstacle has gone out of the detection range of the obstacle detection unit in a state where the braking force is being generated, to release the state where the braking force is being generated when the estimated distance is less than or equal to a predetermined threshold set less than zero, wherein the obstacle detection unit classifies the obstacle into a type of obstacle depending on a detection precision of the distance and the relative speed, and the braking control unit reduces the predetermined threshold so as to be further less than zero as the detection precision becomes lower.

2. The vehicle braking control apparatus as claimed in claim 1, wherein the predetermined threshold is reduced when the obstacle is classified into a type corresponding to a pedestrian, compared to when the obstacle is classified into a type corresponding to a preceding vehicle.

3. The vehicle braking control apparatus as claimed in claim 1, wherein the predetermined threshold is reduced when the obstacle is moving, compared to when the obstacle is stationary.

4. The vehicle braking control apparatus as claimed in claim 1, wherein when the obstacle has gone out of the detection range of the obstacle detection unit in the state where the braking force is being generated, the braking control unit releases the state where the braking force is being generated, when the distance just before the obstacle has gone out of the detection range of the obstacle detection unit, is greater than a predetermined distance.

* * * * *